(12) United States Patent
Akahoshi (10) Patent No.: US 8,151,045 B2
(45) Date of Patent: Apr. 3, 2012

(54) MEDIUM RECORDING/REPRODUCING APPARATUS ENABLING TO NOTICE OF EDITION NUMBER AND METHOD FOR MANAGING EDITION NUMBER OF TIMES

(75) Inventor: Kenji Akahoshi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 701 days.

(21) Appl. No.: 12/080,750

(22) Filed: Apr. 4, 2008

(65) Prior Publication Data

US 2009/0231969 A1 Sep. 17, 2009

(30) Foreign Application Priority Data

May 23, 2007 (JP) .................................. 2007-136123

(51) Int. Cl.
*G06F 13/00* (2006.01)
(52) U.S. Cl. ...................................... 711/112; 711/154
(58) Field of Classification Search .................. 711/112, 711/154
See application file for complete search history.

(56) References Cited

U.S. PATENT DOCUMENTS

| 5,987,575 A * | 11/1999 | Yamaguchi | 711/162 |
| 2005/0201229 A1* | 9/2005 | Sasaki | 369/47.14 |
| 2006/0044979 A1* | 3/2006 | Kuraoka et al. | 369/53.17 |

FOREIGN PATENT DOCUMENTS

JP 2006-216163 8/2006

\* cited by examiner

*Primary Examiner* — Reba I Elmore
(74) *Attorney, Agent, or Firm* — Kilpatrick Townsend & Stockton LLP (57) ABSTRACT

A recording/reproducing apparatus, for conducting edition works, such as, addition, movement, and deletion, etc., of data, onto a postscript type medium, defective management of which is conducted with using a replacement area, is disclosed. The apparatus includes a media information management unit. The medium management information is recorded by a renewal unit within a medium management information area. The apparatus further includes a replacement address information management unit. This is included within the medium management information. Furthermore, the apparatus includes an available number of times of edition works calculation unit. The available number of times of edition works calculation unit calculates the remaining available number of times of edition works, upon basis of remaining capacity of the medium management information area and renewal units thereof. Accordingly, display or notification of a correct available number of times of edition works to a user occurs.

9 Claims, 5 Drawing Sheets

MEDIUM RECORDING/REPRODUCING APPARATUS ENABLING TO NOTICE OF EDITION NUMBER AND METHOD FOR MANAGING EDITION NUMBER OF TIMES

BACKGROUND OF THE INVENTION

The present invention relates to a medium recording/reproducing apparatus and a medium management method, and it relates, in particular, to a method for enabling display/notice of a remaining number of times that can be executed in editing works, such as, addition, movement, deletion, etc., of data, on a medium of postscript (e.g., write-once) type.

In case when tying to reproduce a medium by another equipment, after recording television program and/or data of personal photographing on that medium, for example, in particular, a DVD-R (Digital Versatile Disc-Recordable), representatively, there are very many cases where reproduction can be made unless so-called a "Finalize" process has been conducted thereon, which will not allow the postscript (i.e., addition) of data thereon. However, if conducting that Finalize process, once, since it is impossible to conduct the editing works, such as, addition, movement, and deletion, etc., of data, it is difficult to keep the consistency between both the compatibility with other equipments and the editing works of data.

Nevertheless, since recording/reproducing can be made on a BD-R (Blu-ray Disc-Recordable), which appears on the markets in recent years, by an equipment other than the apparatus having conducted the recording, even before conducting the Finalize process, therefore it is possible to conduct the editing works, such as, the addition, the movement, and the deletion, etc., of data, while keeping the compatibility with the other equipments. This is because of the recording/reproducing method, being called "POW (Pseudo-Overwrite)", for enabling recording/reproducing on the medium, like a medium of rewritable type, irrespective of the fact, i.e., the medium of postscript (i.e., write-once) type.

However, a problem generated when trying to conduct the editing works on the medium of postscript (write-once) type lies in that a remaining capacity of the medium comes to be less if continuing the editing works thereon, but differing from the medium of re-writable type, and therefore, there is a possibility that the editing works cannot be done, suddenly. For the purpose of preventing from this, there is already known a method of noticing or displaying a possible number of times of editions to a user, by estimating disposition information necessary for the editing works while observing the remaining capacity of the medium. This is described in the following Patent Document 1.

[Patent Document 1] Japanese Patent Laying-Open No. 2006-216163 (2001)

BRIEF SUMMARY OF THE INVENTION

As a removable disc recording/reproducing medium, which can be connected with a personal computer, a video camera, a recorder, etc., can be listed up an optical type recording/reproducing medium, such as, a CD (Compact Disc), a DVD (Digital Versatile Disc), a Blu-ray Disc, or a HD-DVD (High-Definition Digital Versatile Disc, for example, and for each of the media, standardization or regulation is established on the medium, upon which only the adding can be made, but not rewritable. As the representative one of such the media is listed up the followings: i.e., CD-R, DVD-R (SL/DL), DVD+R (SL/DL), HD DVD-R (SL/DL), BD-R (SL/DL), where SL (Single Layer) and DL (Double Layers).

As was explained in the above, when conducting the editing works on the postscript type, the problem lies in that overwriting cannot be made due to the capacity limitation thereof. Although the Patent Document 1 proposes to notice or display the remaining number of times of editions on the postscript medium, but the calculation method of the number of times of editions described in the Patent Document 1 never takes the limit of a medium management region, which is owned by the medium, into the consideration thereof, i.e., the number of times of editions is calculated only upon the empty area or region of the data area.

The data area is an area or region where video data and the management information (i.e., the disposition information) of that video data are recorded. The edition works cannot be done, if the medium management area reaches to the recording limit, earlier than the remaining capacity of the data area reaches to that.

For example, in case where only one (1) time of edition works is remained although display indicates thirty (30) times of editions are possible due to a surplus or room remaining in the data area, then it falls down into the condition that the edition works cannot be done, irrespective of displaying that the edition works be possible, in accordance with the method for calculating the number of times of editions described in the Patent Document 1.

Therefore, according to the present invention, for dissolving such the problems, and an object thereof is to provide a medium recording/reproducing apparatus and a medium management method, for enabling to notice or display an available number of times of editions, appropriately.

The object mentioned above is accomplished by the present invention described in the claims attached herewith, i.e., by calculating the number of times of editions from a volume of renewal units of the management information on the medium, which are added with postscript when editing, and also the remaining volume of that management information.

According to the present invention, there can be provided a medium recording apparatus, enabling to calculate an available number of times of editions, and thereby being superior in the operability thereof.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DESCRIPTION OF THE PREFERRED EMBODIMENTS

Hereinafter, an embodiment according to the present invention will be fully explained by referring to the attached drawings.

Figure 1:
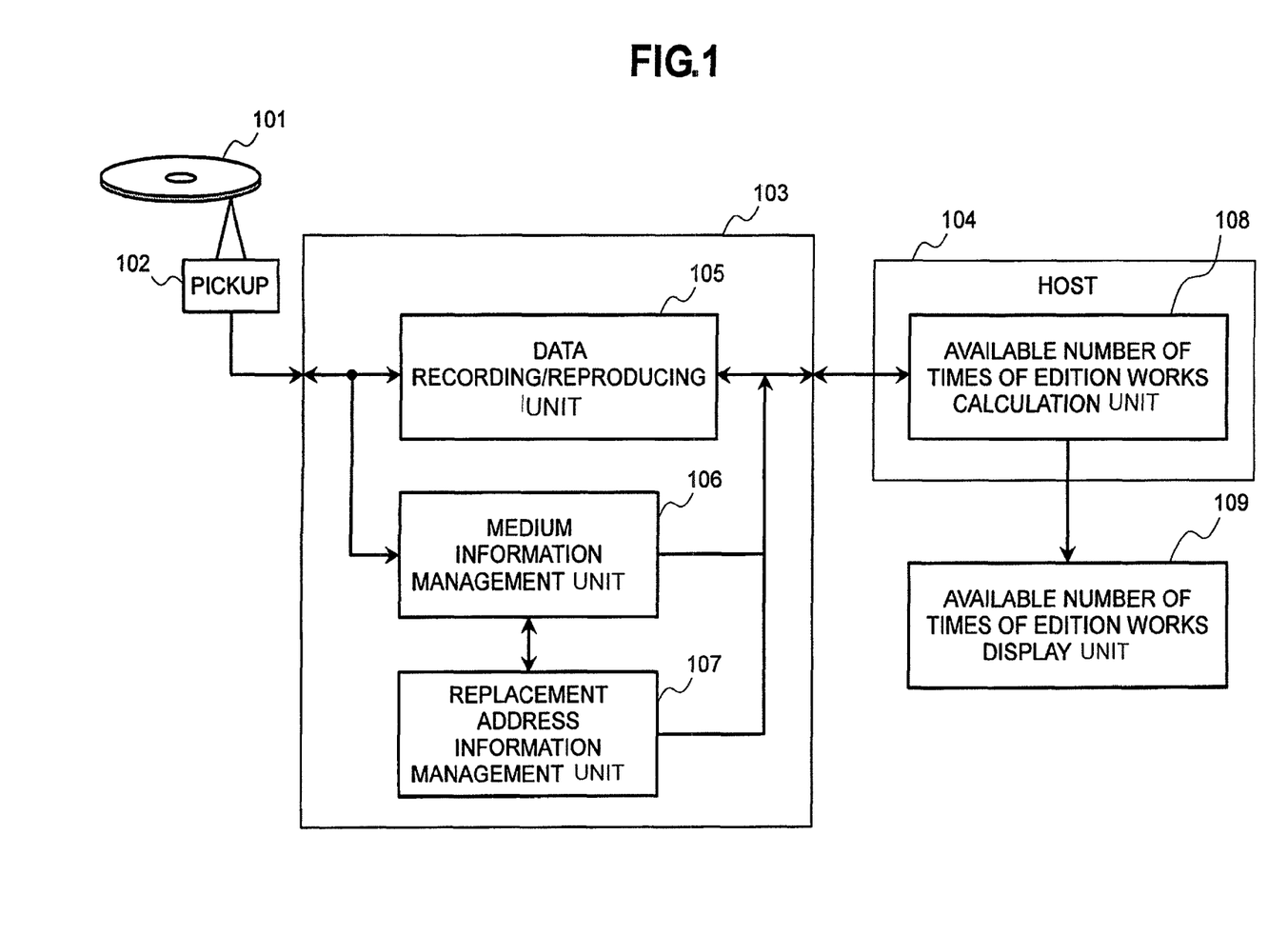
FIG. 1 is a block diagram for showing the structures of a recording/reproducing apparatus, according to an embodiment of the present invention.

FIG. 1 is a block diagram for showing the structures of the recording/reproducing apparatus, according to an embodiment of the present invention. In the same figure, a reference numeral 101 depicts an optical disc, onto/from which data can be recorded/reproduced, 102 a pickup for reading out a recording signal from the optical disc 101, and 103 a recording/reproducing apparatus, respectively. Although not shown in the figure, a data recording/reproducing unit 105 is configured for outputting data read out from the pickup to a host 104 of an external apparatus, or recording the data from the host 104 onto the disc, including, for example, a servo control unit for controlling the pickup 102, configured for demodulating data, and conducting error correction, a temporary memory for memorizing the data temporarily, a temporary memory controller for controlling that temporary memory, and a host I/F for conducting communication between the host 104 in accordance with a protocol, such as, ATAPI (AT Attachment Packet Interface), representatively, etc.

A reference numeral 106 depicts a medium information management unit, and it manages the information necessary for recording/reproducing of the medium 101. A reference numeral 107 depicts a replacement address information management unit, and it manages information relating to the replacement address, as one of the information, which the medium information management unit 106 manages. A reference numeral 108 depicts an available number of times of edition calculation unit, and it calculates a remaining number of times of edition upon basis of the information, which the medium information management unit 106 and the replacement address information management unit 107 manage. A reference numeral 109 depicts an available number of times of edition works display unit, and is a for displaying thereon a number of time of editions, which is calculated within the edition available number of time calculation unit.

However, in FIG. 1 was explained the host 104 to be the external apparatus for the recording/reproducing apparatus, but as a video camera or a recorder, the recording/reproducing apparatus may be built within the host 104 as a unit-type recording/reproducing apparatus, but assuming that the video camera or the recorder is the host, for example.

Figure 2:
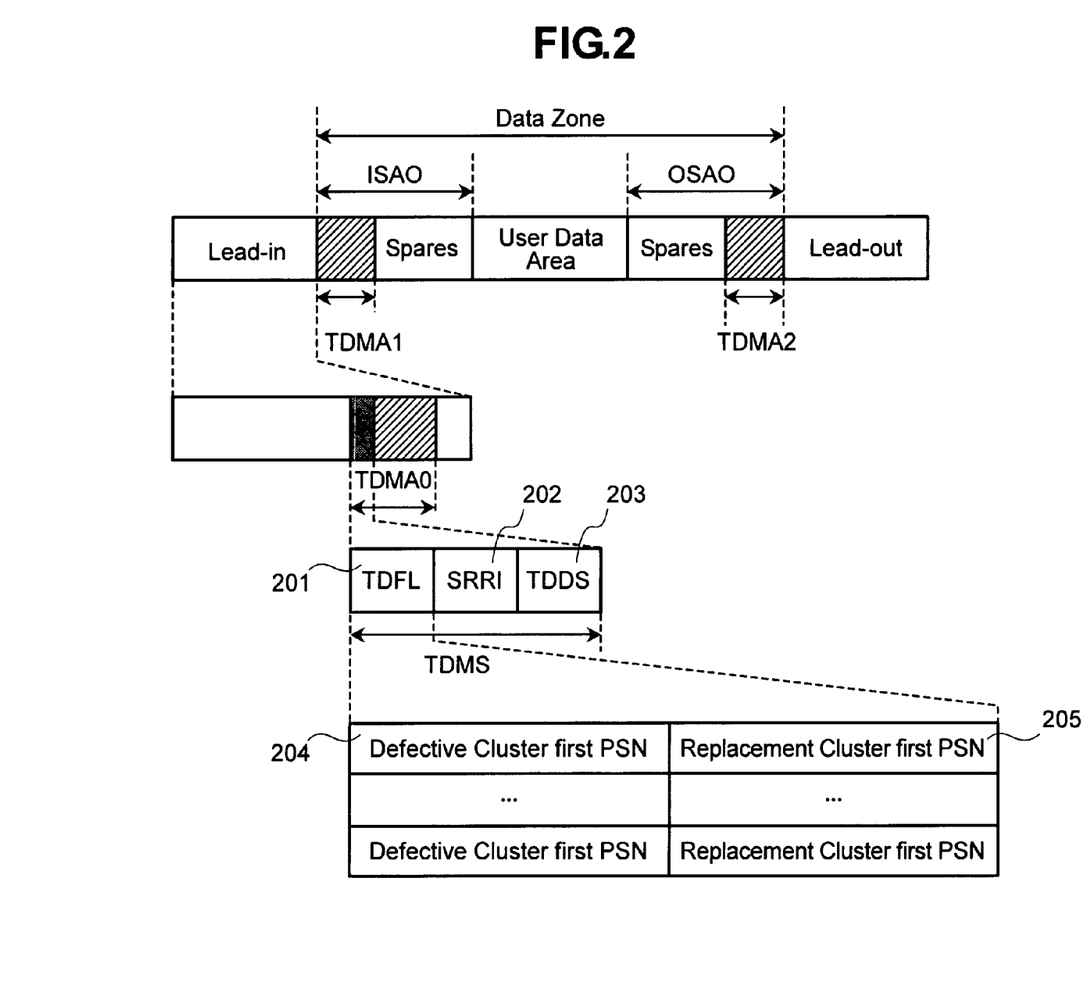
FIG. 2 is a view for showing the entire disc of BD-R.

FIG. 2 is a view for showing the entire structures of a BD-R disc. Dividing roughly, it is constructed with three (3) areas or regions; i.e., a Lead-in area, a Data Zone area, Lead-out area, and further the Data Zone area is constructed with an ISA0 (Inner Space Area 0), a User Data Area, and an OSA0 (Outer Spare Area 0), for example.

A TDMA (Temporary Disc Management Area), i.e., a medium management area, into which is recorded the management information, such as, the recording condition of the medium, for example, lies within the Lead-in area, the ISA0 and the OSA0, and defining TDMA0, TDMA1, and TDMA2, respectively. The TDMA area is made up with plural numbers of TDMS (Temporary Disc Management Structure), and each TDMS is a unit of one (1) time of renewal (i.e., recording). Further, the TDMS is constructed with a TDFL (Temporary Defect List) 201, a SRRI (Sequential Recording Range Information) 202, and a TDDS (Temporary Disc Definition Structure) 203.

The TDFL 201 is used as a list, mainly for managing replacement areas for the defective portions on the disc. A reference numeral 204 depicts "Defective Cluster First PSN" of the defective portion on the disc, and it is indicated that "Replacement Cluster first PSN" depicted by a reference numeral 205 is addressed to be the replacement area thereof. A pair of those 204 and 205 builds up one (1) piece of list, and can be recorded for the area of TDFL.

Within SRRI 202 is included the management information relating to the recording area, corresponding to "Track" of CD, which is mainly called "SRR (Sequential Recording Range)". Also, within TDDS 203 is included the management information of the disc, such as, the disposition information of TDFL, capacities of ISA0, OSA0, etc., for example.

Figure 3A:
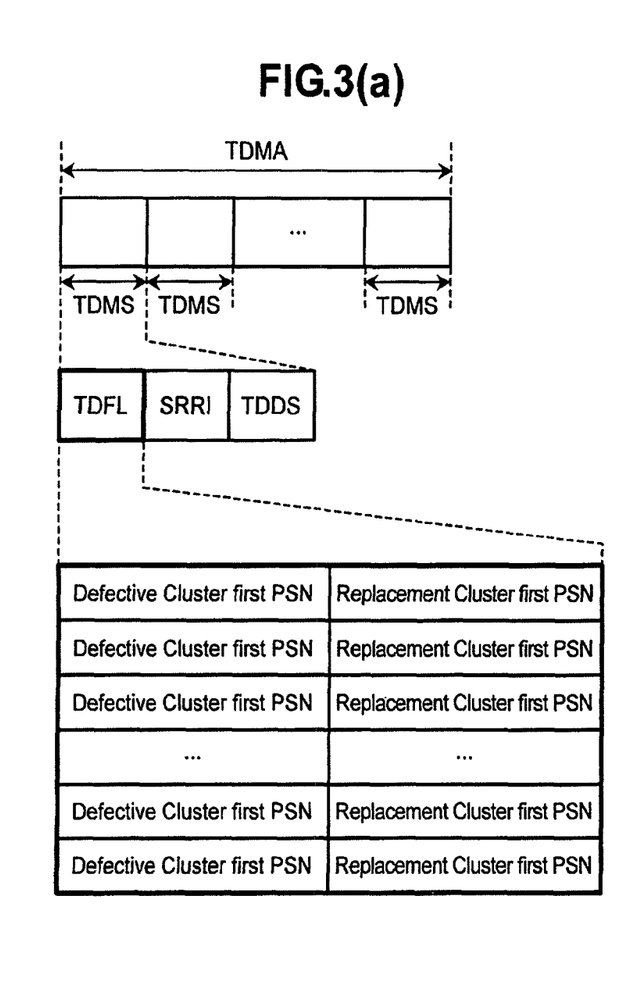
FIGS. 3(a) and 3(b) are views for showing the disposition of TDMS within TDMA.
Figure 3B:
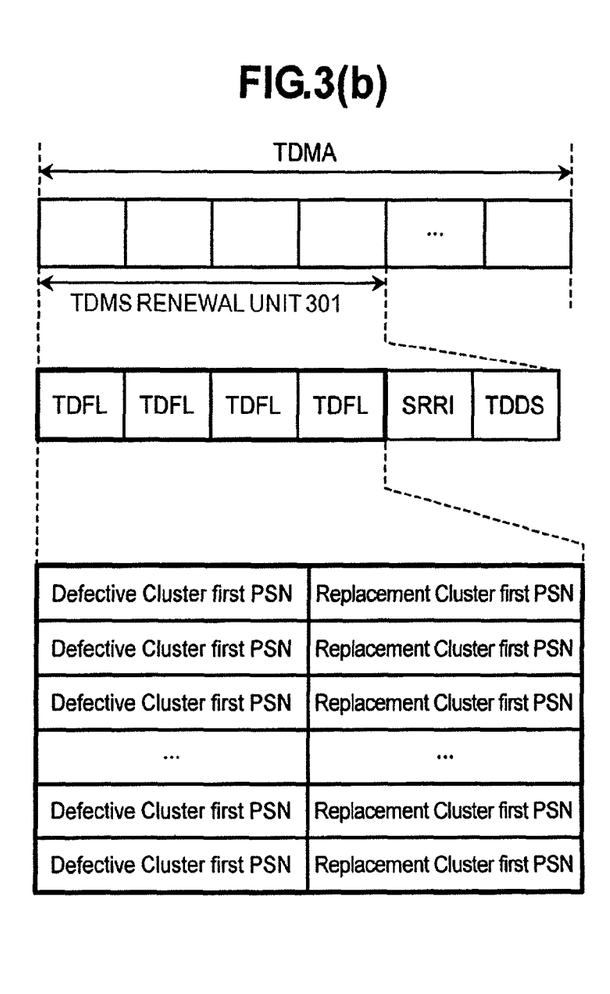

Although the explanation was given by using the TDMA0, but TDMA1 and TDMA2 are similar to that. Further explanation will be made on the TDMS renewal unit 301, by referring to FIGS. 3(a) and 3(b). What is shown in FIG. 3(a) is same to that explained in FIG. 2, but FIG. 3(b) shows an example where the capacity of TDMS renewal unit 301 is increased due to an increase of TDFL, i.e., the renewal unit becomes four (4) times large, comparing to that shown in FIG. 3(a).

In this manner, the TDFL can extend up to a certain number in case when it increases in the register number thereof, but it can be seen that the register number thereof is limited.

Figure 4A:
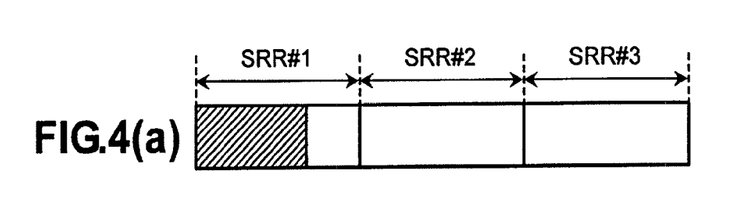
FIGS. 4(a) to 4(d) are views for explaining the POW process.

Next, explanation will be given on the POW process, by referring to FIGS. 4(a) to 4(d). FIG. 4(a) shows up a portion of "User Data Area" on the disc, being cut out therefrom, and this figure shows portions SRR#1 to SRR#3. Explanation will be made with using the figures, i.e., from FIG. 4(a) to FIG. 4(d), sequentially.

First of all, explanation will be made on FIG. 4(a). A portion of SRR#1 in FIG. 4 (a), treated with slant lines, indicates an area where recording is done (e.g., recorded area), and white areas, including a remaining area of SRR#1, SRR#2 and SRR#3, are the areas where recording is not yet done (e.g., non-recoded area).

Figure 4B:
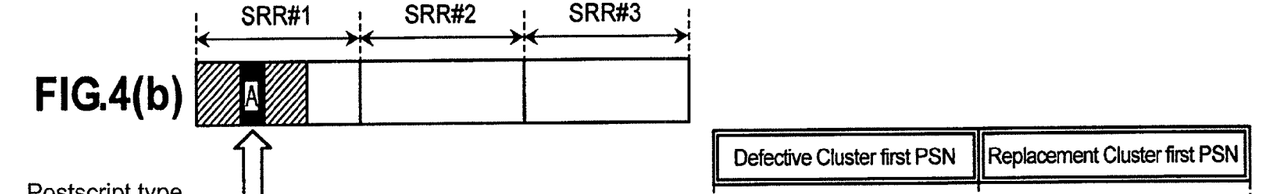

Next, explanation will be made, by referring to FIG. 4 (b). This FIG. 4 (b) indicates that an overwrite command is issued from the host to an area A within the recorded area, from the condition shown in FIG. 4(a).

Next, explanation will be made, by referring to FIG. 4(c). Since this disc is a postscript type media 401, then overwriting cannot be made thereon. Accordingly, in case when there is vacant capacity to add postscript A within the SRR#1, in response to the overwrite command from the host, the postscript is conducted in an area B, in a part of the non-recorded area within the SRR#1.

In that instance, within the TDFL, into "Defective Cluster first PSN" is registered a front address of A, to which the record command is issued originally, and into "Replacement Cluster first PSN" is registered a front address of B, to which recording is actually conducted. With registering this address into TDFL, for the recording/reproducing apparatus, in particular, when reproducing, it is possible to reproduce the data indicated by the address of B, also responding to a reproduction command from the host to A, but without conducting reproduction on the data indicated by the address of A.

Finally, explanation will be made, by referring to FIG. 4(d). This FIG. 4 (d) shows the case where the record command is issued to the position of A, again, being similar to that shown in FIG. 4(b). In the case of FIG. 4(d), since all of the areas within SRR#1 are recorded, then recording is conducted within other empty area(s).

In the example shown in FIGS. 4(a) to 4(d), since a front of SRR#2 is non-recorded, then recording is conducted from a front address C thereof. However, in this example, the recording is generated from the front of SRR#2, but it may be any position other than that, if it is the non-recoded area, including SRR#3, for example.

Figure 4C:
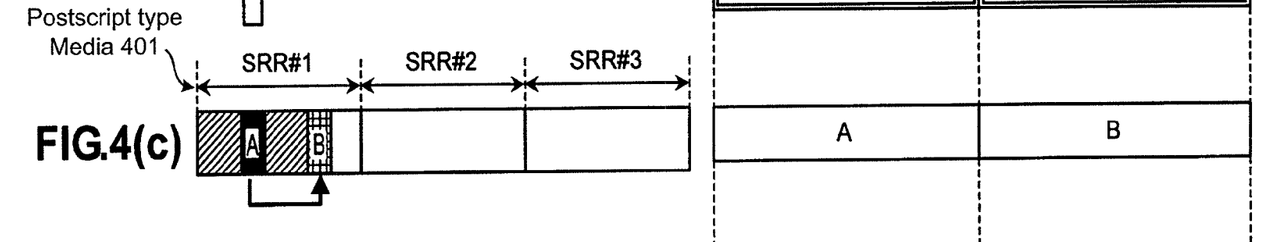
Figure 4D:
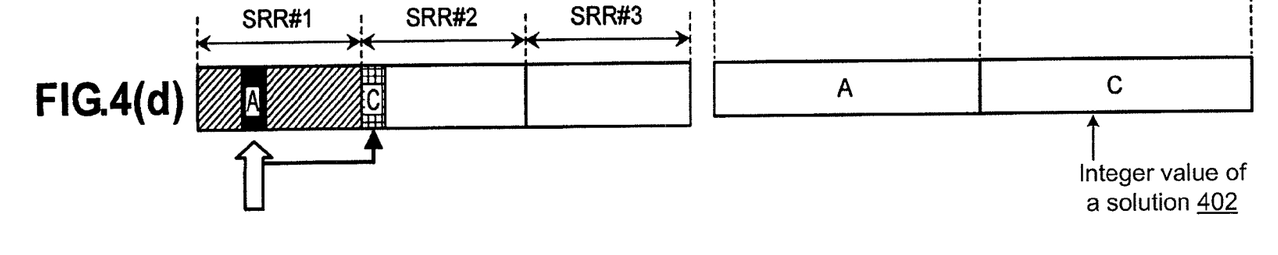

Also similar to that shown in FIG. 4(c), in this instance, within the TDFL, into "Defective Cluster first PSN" is registered a front address of A, to which the record command is issued originally, and into "Replacement Cluster first PSN" is registered a front address of C, to which recording is actually conducted. Because the "Defective Cluster first PSN" is the same address, then contents registered in FIG. 4(c) is registered are deleted, and then the contents are effective, which are registered newly in this time.

However, because of the postscript type media 401, the contents recorded on the disc cannot be deleted. Herein, deleting the contents means that the contents are deleted, logically. Accordingly, even if conducting the logical overwriting by any number of times on A, but for the recording/reproducing apparatus, in particular, when reproducing, by registering the address into this TDFL, again, it is possible to reproduce the newest data indicated by the address actually recorded, but without conducting the reproduction on the data indicated by the address A, also in response to the reproduction command from the host to A.

Figure 5A:
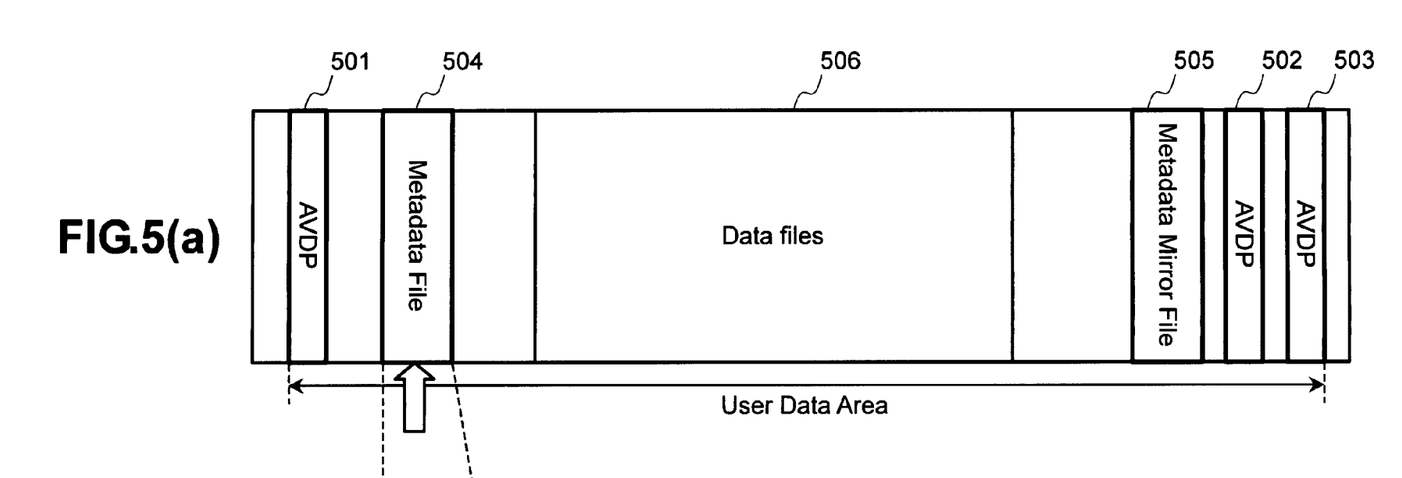
FIGS. 5(a) and 5(b) are views for showing file management information of UDF and disposition thereof on a disc.
Figure 5B:
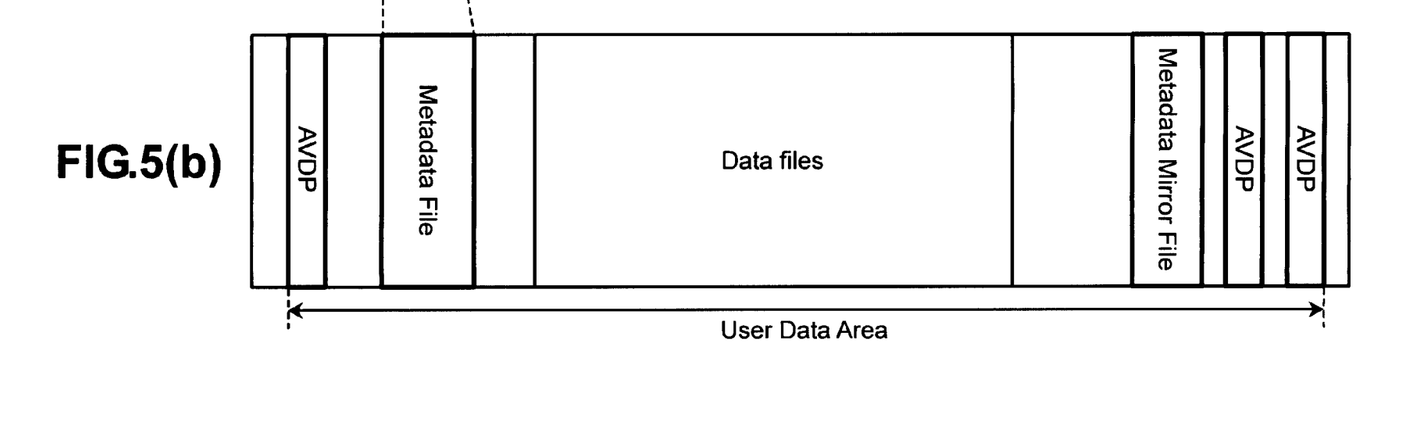

FIGS. 5(a) and 5(b) show the disposition of file management information and files on the disc, of Revision 2.60 of UDF (Universal Disc Format), being the representative file system of an optical disc. Reference numerals 501, 502 and 503 are AVDP (Anchor Volume Descriptor), and this AVDP is recorded within two positions or more, among a sector of LBN (Logical Block Number)=256, a last sector (LBN=Z), and a sector of LBN=Z−256.

The AVDP is a point where the host reads out at first, and it is so constructed that, from here can the host reach to all of files on the optical disc. In this AVDP is included address information, into which VDS (Volume Descriptor Sequence) including two (2) pieces of volume information is recorded. In this VDS are dedicated the information indicative of whether the contents of the logical volume is in the condition of consistency or not and/or a total number of the logical blocks within the logical volume, or Meta Data 504 including FSD (File Set Descriptor) and ICB (Information Control Block) of each file, and a recording position of Meta Data Mirror 505, being a copy of the Meta Data 504, etc.

Accordingly, it can be considered that the data are mainly any one of Meta Data, VDS, and AVDP, on which the logical overwriting can be applied. Herein is assumed a system of renewing the Meta Data and the Meta Data Mirror 505 with the logical overwriting, i.e., a system of using the POW therein.

In FIG. 5(a), when conducting the overwriting the recorded area of Meta Data 504, logically, operation similar to that shown in FIG. 4(b) is executed. Thus, a portion that a logical overwrite portion is recorded within an empty area, and the recorded area is expanded, as is shown in FIG. 5(b); i.e., a remaining capacity within the empty area comes to be less. And, since the "Defective Cluster first PSN" and "Replacement Cluster first PSN" are also registered, as similar to the example shown in FIGS. 4(a) to 4(d), it is possible to access to the newest file even if the host reads AVDP.

With using this system of POW, movement, the edition works, such as, deletion, addition of data can be made on the postscript type medium. However, the logical overwriting can be made, but because it is the postscript type medium, an area used by the Meta Data File increases every time when repeating the edition works, as shown FIG. 5(a)→5(b), while decreasing the empty area where the Meta Data File can be recorded.

Accordingly, even if there is a room within the Data file area 506, and therefore being in the condition that the edition or postscript of video data can be made, but when this Meta Data File cannot be added, then TDFL registration cannot be made, i.e., the host cannot obtain the newest information from AVDP; therefore, the edition works cannot be made.

Then, explanation will be made on the method for displaying a number of times of remaining edition works upon the postscript type media 401, to a user who is conducting that edition works. The medium information management unit 106 in FIG. 1 is provided for observing a remaining TDMA volume shown in FIGS. 3(a) and 3(b). Since the remaining TDMA volume is decreased down every time when conducting the edition works on the medium, observation is made on the remaining volume by using this medium information management unit 106, and thereby notifying that remaining volume to the available number of times of edition calculation unit 108.

A consuming volume of TDMS by one (1) time of the edition works differs depending on every system for conducting the recording/reproducing, herein not described in the details thereof, but it can be determined, uniquely, on the basis of experiments. Assuming that a number of the remaining TDMS is "B" pieces (B: an integer) and a number of TDMS consumed per one (1) time of the edition works is "A" pieces (A: an integer), then an integer value (cut down pieces lower than a decimal point) of a solution 402 of dividing "B" by "A" (B/A) is an available number of times of edition works "C".

Also, the replacement address information management unit 107 observes a number of the lists that can register within the TDFL shown in FIGS. 3(a) and 3(b), and notifies the remaining volume to the available number of times of edition calculation unit 108. Since the list consuming volume, being constructed with a pair of "Defective Cluster first PSN" and "Replacement Cluster first PSN" within one (1) time of edition works differs, for each system executing the recording/reproducing, herein not described in the details thereof, but it can be determined, uniquely, on the basis of experiments.

Assuming that the number of remaining lists is "E" pieces (E: an integer) within the TDFL, and the number of lists consumed by one (1) time of edition works is "D" pieces (D: an integer), then an integer value (cut down pieces lower than a decimal point) of a solution of dividing "E" by "D" (E/D) is an available number of times of edition works "F".

Those available edition numbers "C" and "F" are displayed on the available number of times of edition works display unit 109, then the user can notice that remaining number of the edition works available. Also, in case when those edition available numbers "C" and "F" are different in the value thereof, then a less one of the edition available numbers is selected, to be noticed to the available number of times of edition works display unit 109, thereby enabling a correct edition available number thereon.

Also, in case where the number of times of available edition works is sufficiently large, there can be considered a way of use of giving an alarm to the user by displaying or noticing, only when the number of times is less than a predetermined number of times.

As was mentioned above, according to the present invention, by calculating the number of times of edition works from the volume of renewal units of the management information on the medium, which is added when editing, and the remaining capacity of the management information, it is possible to display or notice the number of times of available edition works, correctly, to the user.

Also, in the embodiment 1, the optical disc was explained by listing up the BD-R, as an example, but the present invention should not be restricted only to the optical disc, and it is needless to say that the similar effects can be obtained by applying the present invention into the recording/reproducing apparatus of using the postscript type medium therein. Also, the method for calculating the available number of times of edition works, in details thereof, but with the division, it is needless to say that the similar effects can be obtained, as far as the method of calculating the available number of times of edition works from the data volume to be recorded when editing and the empty area at the address of recording.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A recording/reproducing apparatus, for conducting edition works of data, onto a postscript type medium, defective management of which is conducted with using a replacement area, comprising:

a media information management unit, which is configured to manage medium management information, which is recorded by a renewal unit within a medium management information area;

a replacement address information management unit, which is configured to manage replacement origin/replacement destination address information, which is included within said medium management information; and an available number of times of edition works calculation unit, which is configured to calculate a remaining available number of times of edition works, wherein said available number of times of edition works calculation unit calculates the remaining available number of times of edition works, upon basis of remaining capacity of the medium management information area and renewal units thereof, the capacity of the renewal unit configured to vary for each corresponding edition work.

2. The recording/reproducing apparatus, as described in the claim 1, wherein said available number of times of edition works calculation unit calculates the remaining available number of times of edition works C, as an integer value of a solution, by dividing B by A, where a number of the renewal units of the medium management information is A, which are necessary when editing, and a number of the remaining units within the medium management information area of the medium management information is B, which said medium information management unit manages, in a method for calculating thereof.

3. The recording/reproducing apparatus, as described in the claim 1, wherein said available number of times of edition works calculation unit calculates the remaining available number of times of edition works F, as an integer value of a solution, by dividing E by D, where a number of the renewal units of replacement address information is D, which are necessary when editing, and a number of remaining units within the replacement origin address and the replacement destination address is E, which said replacement address information management unit manages, in a method for calculating thereof.

4. The recording/reproducing apparatus, as described in the claim 1, wherein said available number of times of edition works calculation unit calculates the remaining available number of times of edition works C, as an integer value of a solution, by dividing B by A, where a number of the renewal units of the medium management information is A, which are necessary when editing, and a number of the remaining units within the medium management information area of the medium management information is B, which said medium information management unit manages, in a method for calculating thereof, and further, said available number of times of edition works calculation unit also calculates the remaining available number of times of edition works F, as an integer value of a solution, by dividing E by D, where a number of the renewal units of replacement address information is D, which are necessary when editing, and a number of remaining units within the replacement origin address and the replacement destination address is E, which said replacement address information management unit manages, in a method for calculating thereof, whereby said available number of times of edition works calculation unit select a smaller one between the two remaining available number of times of edition works C and F.

5. The recording/reproducing apparatus, as described in the claim 1, further comprising an available number of times of edition works display unit, which is configured to display or notice an available number of times of edition works.

6. A recording/reproducing method, for conducting edition works of data, while loading a medium into a recording/reproducing apparatus for recording/reproducing onto a postscript type medium, defective management of which is conducted with using a replacement area, wherein a remaining available number of times of edition works is calculated upon basis of a remaining capacity of a medium management information areas on the medium and renewal units thereof, medium management information being recorded by the renewal unit within the medium management information area, the capacity of the renewal unit configured to vary for each corresponding edition work.

7. The recording/reproducing method, as described in the claim 6, wherein the remaining available number of times of edition works C is calculated, as an integer value of a solution, by dividing B by A, where a number of the renewal units of the medium management information is A, which are necessary when editing, and a number of the remaining units within the medium management information area of the medium management information is B, which said medium information management unit manages, in a method for calculating thereof.

8. The recording/reproducing method, as described in the claim 6, wherein the remaining available number of times of edition works C is calculated, as an integer value of a solution, by dividing B by A, where a number of the renewal units of the medium management information is A, which are necessary when editing, and a number of the remaining units within the medium management information area of the medium management information is B, which said medium information management unit manages, in a method for calculating thereof.

9. The recording/reproducing method, as described in the claim 6, wherein the remaining available number of times of edition works C is calculated, as an integer value of a solution, by dividing B by A, where a number of the renewal units of the medium management information is A, which are necessary when editing, and a number of the remaining units within the medium management information area of the medium management information is B, which said medium information management unit manages, in a method for calculating thereof, and further, the remaining available number of times of edition works C is also calculated, as an integer value of a solution, by dividing B by A, where a number of the renewal units of the medium management information is A, which are necessary when editing, and a number of the remaining units within the medium management information area of the medium management information is B, which said medium information management unit manages, in a method for calculating thereof, whereby a smaller one is selected between the two remaining available number of times of edition works C and F.

* * * * *